March 24, 1970     D. W. BENTZEN ET AL     3,502,048
DIFFERENTIAL PRESSURE INDICATOR
Filed Sept. 17, 1965
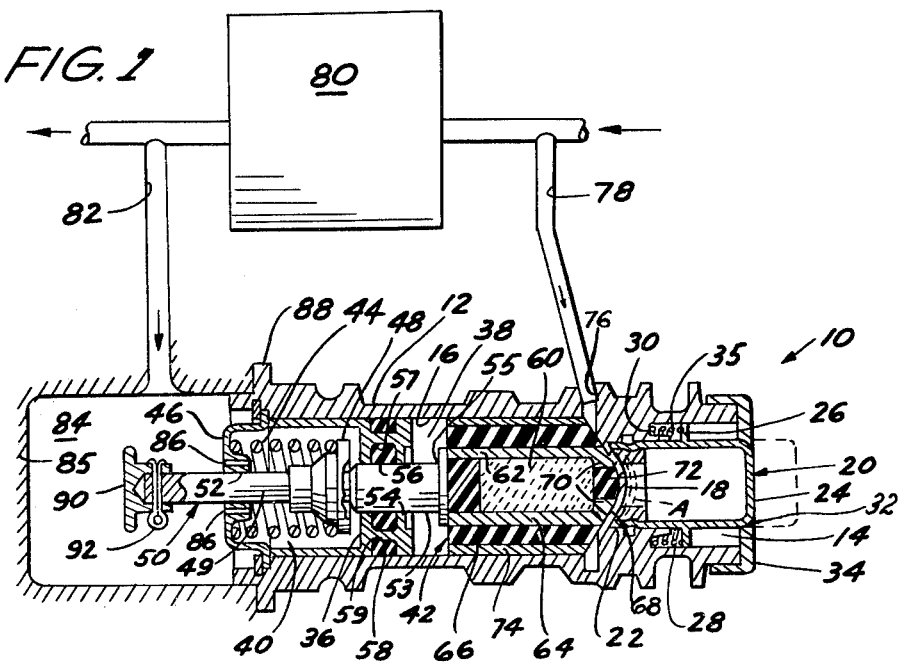
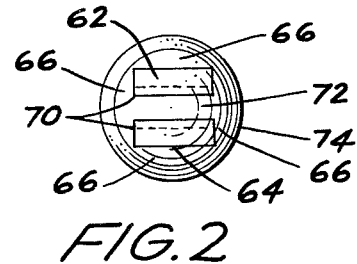
DONALD W. BENTZEN
JONATHAN BAKER, JR.
INVENTORS
BY Walter Patnoka, Jr.
John P. Moran
ATTORNEY

United States Patent Office 3,502,048
Patented Mar. 24, 1970

---

3,502,048
DIFFERENTIAL PRESSURE INDICATOR
Donald W. Bentzen, Grosse Pointe, and Jonathan Baker, Jr., Royal Oak, Mich., assignors to Holley Carburetor Company, Warren, Mich., a corporation of Michigan
Filed Sept. 17, 1965, Ser. No. 488,066
Int. Cl. G01l 19/12; B01d 35/00
U.S. Cl. 116—70                               4 Claims

ABSTRACT OF THE DISCLOSURE

An improvement in a magnetic differential pressure indicator of the type wherein a spring-biased pressure responsive magnetic element either retains or releases a spring-biased armature member depending upon the position of the element in a cylinder receiving the higher of two pressures, the improvement comprising structure for admitting the higher pressure to equal-area opposite sides of the element and reducing the area of the spring-biased side thereof by an area equal to that acted upon by the lower pressure, the result being that the higher and the lower pressures act in opposite directions upon equal areas so as to increase the level of the pressure differential that can be sensed with the same magnetic and biasing forces that are operable for sensing lower level differential pressures.

---

This invention relates generally to differential pressure indicators, and more particularly to an improved magnetic device for indicating the existence of relatively high pressure differential.

In hydraulic systems wherein fluid passes through some mechanism such as a filter, for example, various devices have been proposed for indicating when the pressure across the mechanism has dropped, such as when the filter has become loaded with foreign matter. An example of some of these devices, which are oftentimes used in aircraft applications so that they must necessarily be small and light-weight, may be found in U.S. Patent application Ser. No. 375,219, filed in the names of Leonard W. Keil and Carl F. Schorn on June 15, 1964.

As will be explained, the prior art structures referred to above are suitable for indicating relatively low pressure differentials; if some or all of the components thereof were changed to adapt the same for higher pressure differentials, the resultant device would either become too large for aircraft applications or not function properly.

Accordingly, a general object of this invention is to provide a simple, light-weight warning device which may be associated with any fluid flowing system for visually or otherwise indicating when the pressure differential across the system has become greater than some predetermined value.

Another object of the invention is to provide such a device which remains relatively small, say on the order of the size of the above mentioned prior art devices, even though the pressure differential to be indicated is relatively large.

A more specific object of the invention is to provide such a device, including a magnet assembly that has a relatively small effective area which, when combined with a suitable spring arrangement, will respond only to a relatively high predetermined pressure differential and, yet, will be large enough to withstand a relatively high accelerative force, say 30 G or more, without giving a false signal.

A still further object of the invention is to retain as many of the desirable features of the prior art devices as possible.

These and other objects and advantages of the invention will become more apparent when reference is made to the following specification and the accompanying drawings wherein:

FIGURE 1 is a longitudinal cross-sectional view of an indicator device embodying the invention, the device being associated with a schematically illustrated mechanism through which a variable pressure fluid passes;

FIGURE 2 is an end view of the magnet assembly shown by FIGURE 1; and

FIGURE 3 is a longitudinal cross-sectional view of a prior art device, for purposes of comparison.

Before discussing the drawings in detail, it should be understood that, with the exception of the magnet components included in the magnetic piston assembly, one end of which is shown by FIGURE 2, the devices shown are of a cylindrical construction. Thus, the longitudinal cross-sectional views shown by FIGURES 1 and 3 are adequate for a complete disclosure.

With the above general description in mind, FIGURE 1 illustrates a device 10 comprising an aluminum or other non-magnetic body 12 having a pair of cylindrical cavities 14 and 16 formed from the opposite ends thereof. A relatively thin dome-shaped wall 18 separates the two cavities, the purpose of the shape of the wall to be described later.

The cavity 14 adjacent the convex side of the wall 18 houses a signal button assembly 20, which includes a ferro-magnetic, corrosion resistant armature 22 fixedly secured to a hollow signal button 24, the latter having an external flange 26 formed thereon. A resilient means, such as a coil spring 28, located between the flange 26 and a wall 30 of the cavity 14, urges the button 24 away from the dome-shaped wall 18 and through an opening 32 formed in a cover plate 34, which is secured by any suitable means to one end of the body 12. The spring and button may be guided by an annular flange 35, the indicating portion of the button being shown by the dotted line.

A fixed wall 36 divides the cavity 16 into two chambers 38 and 40. A magnetic piston assembly 42 is slidably mounted in the chamber 38 and is normally held against the wall 18 by a spring 44 mounted in the chamber 40 between the cover plate 46 and a spring retainer 48. The latter is mounted around the smaller diameter portion 49 of a nonmagnetic reset rod 50 which extends through a center opening 52 in the cover plate 46. The larger diameter portion 53 of the rod 50 extends through a center opening 54 in the wall 36 and is secured in some suitable manner to a ferro-magnetic collar 55, which, in turn, is attracted by and continually held against the magnetic piston assembly 42.

A seal ring 56 is confined within a groove 57 formed around the inner periphery of the wall 36 around the larger diameter portion 53 of the reset rod 50. A second seal ring 58 is mounted in a groove 59 formed around the outer periphery of the fixed wall 36, within the cylinder 16. The seal rings 56 and 58 serve to prevent leakage between the chambers 38 and 40.

The magnetic piston assembly 42 comprises a magnet 60 having north and south pole bars 62 and 64 adjacent the poles thereof and being surrounded on all but the ends thereof by a suitable potting material 66. In order to provide a maximum exposed area of the pole bars at the end 68 adjacent the domed wall 18, without providing an efficient metallic path for the lines of magnetic force to flow through on the magnet side of the wall 18, the ends may be formed to include internal flanges 70, separated by a gap 72 which is also filled with potting material 66. The material 66 and the magnet 60 are enclosed by a non-magnetic sleeve 74 which is slidably mounted in the cavity 38, as previously explained. As in the case of the armature 22, the uncovered ends 68 of the pole bars 62 and 64, and the portion of the potting material in the gap 72, are shaped to substantially conform to the concave side of the dome-shaped wall 18. By having the magnet 60 arranged with the north and south poles 62 and 64 oppositely disposed, a relatively strong magnetic circuit is readily completed, as by the field represented by lines A, resulting in a powerful attraction of the armature. The proposed magnet construction permits the use of a relatively light-weight magnet assembly 42 which is ideal for aircraft applications wherein the device would at times be subjected to extreme high dynamic loads or "G" forces.

An inlet port 76 located in the chamber 38 adjacent the domed end of the magnet assembly 42 may be connected by a conduit 78 to a source of high pressure fluid, such as the upstream side of mechanism 80 through which fluid from a suitable fluid reservoir (not shown) must pass. The chamber 40 may be connected to the downstream side of the mechanism 80 by a conduit 82, a chamber 84 formed in the using structure 85, such as the aircraft on which the mechanism 80 is employed, and a plurality of ports 86 formed through the cover plate 46. The body 12 is mounted against the structure 85 in any suitable manner, such as by flanges 88, so that the cover plate end of the body 12 and the external extension of the reset rod 50 extend into the chamber 84. A push button or cap 90 may be fastened to the outer end of the rod 50, if desired, by any suitable means, such as a cotter pin 92.

It will be noted from FIGURE 3 that the structure of the prior art device 100 is similar in many respects to the structure embodied in the invention. Accordingly, all parts common to both devices will bear the same reference numerals.

Insofar as individual elements are concerned, it will be noted that the device 100, FIGURE 3, includes a seal ring 102 confined in a groove 104 and surrounding the magnetic piston assembly 42. Hence, the assembly 42 serves as a movable wall which divides the chamber 16 into two variable chambers 106 and 108. A ferro-magnetic element 110 is mounted in the chamber 108 and confined therein by an end plate 112. Openings 114 and 116 are formed in the ends of the element 110, and the end plate 112 is abutted against the open end 116. Openings 118 through the end plate 112 serve to communicate between an external source of low pressure and the internal portion of the element 110 in much the same manner as do the openings 86 (FIGURE 1) with the chamber 40. Radial openings 120 communicate between the central portion of the element 110 and the surrounding chamber 108.

A spring 122 is mounted in the chamber 108, around the element 110 and between the left-hand end of the magnetic piston 42 and a flange 124 formed around the opening 116 of the element 110. A central opening 126 is formed in the end plate 112, such that a reset rod 128 may be slidably mounted therethrough. Note that the reset rod 128 of FIGURE 3 differs from the reset rod 50 of FIGURE 1 in that it is not connected to the magnetic piston assembly 42; rather, it includes a flared end 130 which is urged against a flared end of the opening 114 by means of a spring 132. The latter is mounted around the reset rod 128 between the outside surface of the end plate 112 and a recessed cap 134 formed on the outer end of the rod 128. The left-hand end of the body 12 of FIGURE 3 would likewise be located in a chamber, similar to the chamber 84 of FIGURE 1.

Operation

Referring once again to FIGURE 1, so long as the pressure drop across the mechanism 80, whether it be a filter or other type device, remains within certain predetermined relatively high limits, within a range of, say, 25 p.s.i. to 150 p.s.i., for example, the pressures entering the chamber 38 via the inlet 76 and the chamber 40 via the ports 86 will not cause any movement of the piston assembly 42. The piston assembly 42 is urged toward wall 18 by the spring 44 through the medium of the retaining ring 48, the reset rod 50 and the connecting flange 55, as previously explained. The force of the spring 44 is such that once the pressure drop across the device 80 reaches the predetermined value, say 125 p.s.i., this pressure will operate against the domed end of the assembly 42 over an area equivalent to the area of the larger diameter portion 53 of the reset rod 50, as will now be explained.

The pressure of the fluid entering the chamber 38 through the inlet port 76 is effective against both ends of the magnetic assembly 42, there being no seal rings around the assembly 42, except for the area of the attached reset rod portion 53. The pressure of the fluid entering the chamber 84 via the conduit 82 is effective against the end 90 of the reset rod 50 over an area also equivalent to the area of the rod portion 53 within the opening 54, all directly opposing forces on the cap 90 and the ring 48 serving to cancel one another out.

Once the pressure differential over the area just described becomes such that the magnetic assembly 42 leaves the wall 18, compressing the spring 44, the pole pieces 62 and 64 will be attracted toward the fixed wall 36. Since the magnetic force induced in the ferro-magnetic armature 22 is proportional to the reciprocal of the square of its distance from the magnet 60, once this induced force becomes less than the force of the spring 28, the signal button assembly 20 will be propelled to its dotted line position until the flange 26 abuts against the cover plate 34. The signal button 24 will thus remain exposed and the assembly 42 will remain in contact with the wall 36 until such time as the problem causing the pressure differential has been corrected and the reset rod 50 is manually pushed toward the right in FIGURE 1. This will return the assembly 42 to its normal position against the concave side of the wall 18, and the assembly 20 may thereupon be returned to its position against the convex side of the wall 18.

Referring now to the prior art device of FIGURE 3, it may be noted that the seal 102 serves to prevent communication between the right-hand end and the left-hand end of the assembly 42. In this device, once the pressure on the entire area of the right hand end 72 of the assembly 42 reaches a predetermined value greater than the pressure in the chamber 108 against the left-hand end of the assembly 42, the assembly 42 will move to the left, compressing the spring 122, and become attracted toward the end of the element 110. It will remain in this position until the reset rod 128 is pushed to the right far enough to eliminate the attraction between the assembly 42 and the element 110, at which time the reset rod 128 may be released and, since it is not connected to the assembly 42, be urged leftward by the spring 132.

Since the pressure entering through the inlet 76 acts upon the entire right hand end of the assembly 42, if the device 100 were used in an application wherein a signal was to be given when the pressure differential became relatively high, the spring 122 would have to be a relatively large and strong spring. As such, as soon as the pressure in the chamber 106 were to subside, such as when the system is shut down, the assembly 42 would not remain against the element 110 but, rather, would be snapped back by the spring 122 against the domed wall 18. Hence, the purpose of the device, namely, to continually signal that a problem exists until said problem is remedied, would be lost.

On the other hand, while it would be possible to enlarge the housing 12 and the assembly 42, along with the spring 122, such that a stronger magnetic attraction would occur between the assembly 42 and the element 110, the need for a small sized device 100 would be defeated.

It should be understood that the device 100 (the drawings are approximately twice the actual size) cannot just simply be made smaller in all respects, in order to produce the desired smaller effective area upon which the differential pressures must act. This is due to the fact that the magnetic piston assembly 42 in each device must be sufficiently large to be able to attract the armature 22 through the wall 18. The magnetic attraction available in a magnetic assembly only as large as the rod diameter 53 of FIGURE 1 would be of such a value that the armature 22 could not be held, particularly if extreme high dynamic loads or "G" forces were encountered.

Thus, it can be seen that the device 10 of FIGURE 1 is constructed so that the working pressures are effective across a relatively small area, as explained above, and, accordingly, the components of the structure 12 may remain small and compact and still function properly under the considerably higher pressure differentials which may have to be sensed in particular applications; at the same time, the magnet assembly remains large enough to withstand high dynamic loads.

It should be understood that the device 10 is not limited to a visual indicator since structure may be added to give an audible or other indication.

While but one embodiment of the invention has been shown and described, other modifications of the invention are possible within the scope of the appended claims.

What we claim as our invention is:

1. A device adapted to be connected in a fluid pressure system and to respond to the existence of a predetermined differential between a first lower pressure and a second higher pressure in the system, said device comprising fluid pressure responsive means having a lesser actual area to be acted upon by said lower pressure and a greater actual but equal effective area to be acted upon by said higher pressure, and spring means assisting said lower pressure in resisting movement of said first means by said higher pressure, said pressure responsive means comprising separate first and second piston elements, said first element being movable through a seal isolating said lower and higher pressures, said spring means being operative upon a free end of said first element and urging the opposite end thereof into engagement with the adjacent end of said second element so that said elements respond to a pressure differential as a single unit, said first and said second elements each have equal area opposite ends, the end area of said second element being greater than the end area of said first element, whereby said engagement of the adjacent ends of said elements provide a fluid pressure responsive means having opposite end effective areas equal to the free end area of said first element, said device comprising further a housing having first and second aligned chambers separated by a fixed wall having an axial opening, said isolating seal being disposed in said opening, said second chamber being closed at its other end by a second fixed wall, said free end of said first element being disposed in said first chamber and the other end thereof being disposed in said second chamber, said second element being disposed entirely in said second chamber with clearance, means for communicating said lower pressure to said first chamber and means for communicating said higher pressure to said second chamber at both ends of said second element through said clearance.

2. A device such as that recited in claim 1, wherein a spring biased indicator element is disposed on the side of said second fixed wall opposite said second chamber, said housing and said second fixed wall are not magnetic, and said fluid pressure responsive means on the one hand and said first wall and said indicator element on the other hand are mutually-magnetically attracted, whereby said pressure responsive means either retains or releases said indicator element from engagement with said second wall, depending upon the proximity of said pressure responsive means to said second wall in response to said differential pressure.

3. A device such as that recited in claim 2, wherein said first wall is mutually attracted with said pressure responsive means so that when said pressure responsive means is moved to said first wall it is retained thereby against the force of said spring.

4. A device such as that recited in claim 2, wherein means are provided for resetting said pressure responsive means away from said first wall.

References Cited

UNITED STATES PATENTS

| | | | |
|---|---|---|---|
| 2,577,165 | 12/1951 | Thorsheim | 200—84 |
| 2,711,454 | 6/1955 | Opuszenski | 200—84 |
| 3,077,176 | 2/1963 | Pall et al. | 116—70 |
| 3,131,462 | 5/1964 | Owings et al. | 29—155.59 |
| 3,154,049 | 10/1964 | Smith et al. | 116—70 |
| 3,164,756 | 1/1965 | Steingroever | 335—302 |
| 3,200,787 | 8/1965 | Darnell | 116—70 |
| 3,232,266 | 2/1966 | Levesque | 116—70 |
| 3,366,758 | 1/1968 | Bentzen et al. | 116—70 XR |
| 3,413,951 | 12/1968 | Keil et al. | 116—70 |

LOUIS J. CAPOZI, Primary Examiner

U.S. Cl. X.R.

210—90